United States Patent [19]
Holt

[11] Patent Number: 5,530,816
[45] Date of Patent: Jun. 25, 1996

[54] DATA PROCESSING SYSTEM FOR HANDLING MULTIPLE INDEPENDENT DATA-DRIVEN INSTRUCTION STREAMS

[75] Inventor: Nicholas P. Holt, Padfield, Great Britain

[73] Assignee: International Computers Limited, Putney, United Kingdom

[21] Appl. No.: 328,575

[22] Filed: Oct. 24, 1994

Related U.S. Application Data

[63] Continuation of Ser. No. 938,824, Sep. 1, 1992, abandoned.

[30] Foreign Application Priority Data

Nov. 2, 1991 [GB] United Kingdom ............... 9123271

[51] Int. Cl.⁶ ............................................. G06F 7/00
[52] U.S. Cl. ........................ 395/375; 364/DIG. 1; 364/DIG. 2; 364/228; 364/228.3; 364/230; 364/262.4; 364/263
[58] Field of Search .............. 364/DIG. 1 MS File, 364/DIG. 2 MS File; 395/200, 250, 400, 425, 375, 800, 200.01, 200.08, 310, 401, 405, 420, 427, 440, 650

[56] References Cited

U.S. PATENT DOCUMENTS

| | | | |
|---|---|---|---|
| 3,728,692 | 4/1993 | Fennel | 340/172.5 |
| 5,233,694 | 8/1993 | Hotta et al. | 395/375 |
| 5,247,628 | 9/1993 | Grohoski | 395/375 |

FOREIGN PATENT DOCUMENTS

| | | |
|---|---|---|
| 0301220 | 2/1989 | European Pat. Off. . |
| 0352935 | 1/1990 | European Pat. Off. . |

OTHER PUBLICATIONS

Dollas et al., "The Case For the Sustained Performance Computer Architecture", Computer Architecture News, vol. 17, No. 6, Dec. 1991, pp. 129–136.

Hirata et al., "An Elementary Processor Architecture With Simultaneous Instruction Issuing From Multiple Threads", Computer Architecture News, vol. 20, No. 2, May 1992, pp. 136–145.

Lighten et al., "The Metaflow Lightening Chipset", Spring Compcon 91, 36th IEEE Computer Society International Conference, San Francisco, Feb. 25, 1991, pp. 13–18.

Andrew S. Tanenbaum "Structured Computer Organization" ISBN-0-14 854489-1 (1984) pp. 10–12.

*Primary Examiner*—Robert B. Harrell
*Attorney, Agent, or Firm*—Lee, Mann, Smith, McWilliams, Sweeney & Ohlson

[57] ABSTRACT

A data processing system has a scheduling unit for scheduling instructions from a number of instruction streams, and assigning those instructions to a number of execution units. A termination unit receives the results of the execution and informs the scheduling unit of which operands are available. The scheduling unit uses the operand availability information to control the scheduling of the instructions.

4 Claims, 1 Drawing Sheet

DATA PROCESSING SYSTEM FOR HANDLING MULTIPLE INDEPENDENT DATA-DRIVEN INSTRUCTION STREAMS

This application is a continuation of U.S. application Ser. No. 938,824, filed Sep. 1, 1992, now abandoned.

BACKGROUND TO THE INVENTION

This invention relates to data processing systems.

The performance of data processing units is improving at a rate greater than that of main memory (RAM) storage. The latencies involved in memory access are typically several times the average execution time of an instruction and can thus degrade performance dramatically. On the other hand, the latencies are not usually long enough to make it worth while switching to execute a different process while the memory is being accessed.

The effect of memory latency on processor performance can be reduced by reducing the number of main memory accesses, for example by using a large, possibly multi-level cache. However, for some types of application it is almost impossible to reduce the cache miss rate to less than 5%–10% and in such cases memory access time can still dominate the overall processor performance. For example, large database applications typically exhibit random access profiles to records which may be distributed within gigabytes of memory and in such a case the cache miss rate can be very high.

The object of the present invention is to provide a novel data processing system architecture which overcomes or alleviates these problems.

SUMMARY OF THE INVENTION

According to the invention there is provided a data processing system comprising:

(a) a plurality of instruction buffers for buffering instructions from a plurality of independent instruction streams, (b) a plurality of execution units, for executing instructions, (c) a termination unit for receiving results of execution from the execution units and for producing indications of which operands are made available by said results, and (d) a scheduling unit responsive to said indications from the termination unit, for determining which instructions in said instruction buffers have all their operands available and for assigning those instructions to the execution units for execution.

Thus, it can be seen that the invention provides the ability to run multiple independent data-driven instruction streams. Since the streams are independent, if instructions from one stream are held up by a memory access, it will in general be possible to continue processing another stream and hence the effects of memory latency will be masked.

One particularly useful result of this is that it becomes possible to trade memory bandwidth for low latency in memory designs. High memory bandwidth can be achieved relatively cheaply for example by using partitioned or interleaved memories. Low-latency memories, on the other hand, requires the use of faster technology, and this usually results in greater cost and reduced scaleability.

DESCRIPTION OF AN EMBODIMENT OF THE INVENTION

Figure 1:
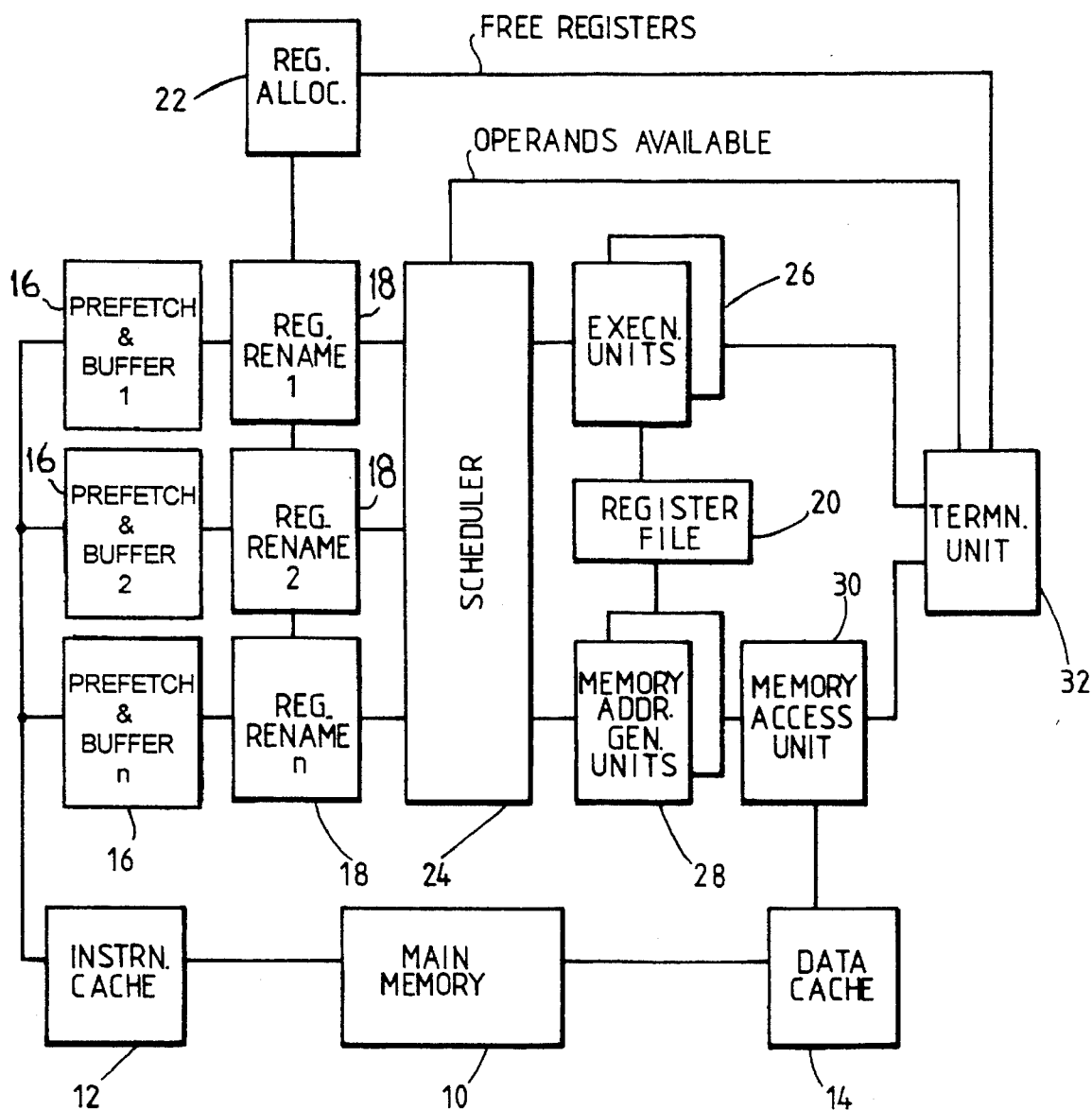
FIG. 1 is a block diagram of a data processing system embodying the invention.

One data processing system in accordance with the invention will now be described by way of example with reference to the accompanying drawing.

The system is designed to handle a plurality of independent processes simultaneously. Each of these processes has a unique context number allocated to it, and consists of an independent stream of instructions.

Referring to the drawing, the system includes a main memory 10, which holds both data (operands) and instructions. Copies of recently used instructions are held in an instruction cache 12, and copies of recently used operands are held in a data cache 14. The caches 12, 14 are small and fast relative to the main memory 10 and allow instructions and operands to be accessed rapidly, provided that they are available in the cache. Each entry in the caches is tagged with the context number of the process to which it relates.

The system also includes a plurality of instruction prefetch and buffer units 16, one for each of a number of independent instruction streams. Each of these units 16 prefetches a sequence of instructions for a particular instruction stream, either from the instruction cache 12 (if the required instruction is available in the cache) or from the main memory 10. The prefetched instructions are held in a first-in-first-out queue, the process context number being stored along with each instruction. The instruction fetch and buffer units also perform branch prediction and speculative branch fetches.

The system also includes a plurality of register renaming units 18, one for each of the independent instruction streams. These perform register renaming operations so as to map the architecturally defined process state registers (such as stack front register, accumulator and descriptor register) on to a number of physical registers in a register file 20. The renaming units 18 keep track of the renaming state of each process independently, but have common register allocation logic 22 for allocating registers to the streams in a globally unique manner.

The instructions from the prefetch and buffer units 16 are fed, by way of the register renaming units 18, to an instruction scheduler 24, which schedules the instructions for execution and passes them to one of a number of execution units 26 and/or one of a number of memory address generation units 28. The operation of the scheduler 24 will be described in more detail below.

The execution units 26 can operate in parallel to execute a number of independent instructions simultaneously. An instruction from any one of the instruction streams can be scheduled to any one of the execution units; the execution units need not be aware of the process context of the work they perform. Similarly, the address generation units 28 can generate memory addresses for a number of independent instructions simultaneously in parallel. The execution units 26 and address generation units 28 both have access to the register file 20 to allow them to read and update the appropriate registers.

The outputs of the address generation units 28 are fed to common memory access unit 30 which accesses the data cache 14 or the main memory 10, so as to fetch the specified operands.

The results from the execution units 26 and the memory access unit 30 are passed to a termination unit 32. For each process the termination unit 32 maintains a record of the most recent guaranteed correct state of that process, so as to allow recovery of the process in the case of exception. In order to achieve this the termination unit 32 uses the process context number associated with each terminating instruction to index a state table so as to update the state of the process in question.

When an instruction is successfully terminated its result becomes available to any instruction that requires this result as an input operand. The termination unit 24 feeds the results of terminating instructions back to the scheduler 24, for use by the scheduler in determining which instructions to schedule, as will be described.

A physical register (in the register file 20) may become free (ie eligible for re-use) if all instructions that could have made reference to that physical register have been successfully terminated. The termination unit 32 detects this, and passes the identity of the free register back to the register allocation unit 22 so that it can be reallocated.

The operation of the scheduling unit 24 will now be described in more detail.

The scheduling unit receives the instructions from the instruction buffers 16, and determines which of these have all their operands available (as indicated by the results from the termination stage) and hence are eligible for immediate execution. If more than one instruction is eligible, one is selected on the basis of a predetermined scheduling policy (which may, for example, involve scheduling on a predetermined priority basis).

The selected instruction is then passed to any available one of the execution units and/or memory address generation units, for processing as required.

I claim:

1. A data processing system comprising:

(a) a plurality of instruction prefetch and buffer means for prefetching and buffering instructions from respective ones of a plurality of independent programs, (b) a plurality of execution means for executing instructions, (c) termination means for receiving results of execution from the execution means and for producing indications of which operands are made available by said results, and (d) scheduling means responsive to said indications from the termination means, for determining which instructions buffered in said instruction prefetch and buffer means have all their operands available and for assigning those instructions to the execution means for execution.

2. A system according to claim 1 further including register file means for holding a plurality of physical registers, and a plurality of register renaming means, one for each of said instruction prefetch and buffer means, for mapping logical register identities from each of said plurality of independent programs on to the physical registers.

3. A system according to claim 2 further including register allocation means, common to all the register renaming means, for allocating a free physical register to a logical register.

4. A system according to claim 1 further including a main memory and instruction cache means for holding copies of instructions from the main memory, and for feeding instructions to all said prefetch and buffering means.

* * * * *